3,657,255
CONTINUOUS PROCESS FOR PRODUCTION OF ISOCINCHOMERONIC ACID AND NICOTINIC ACID

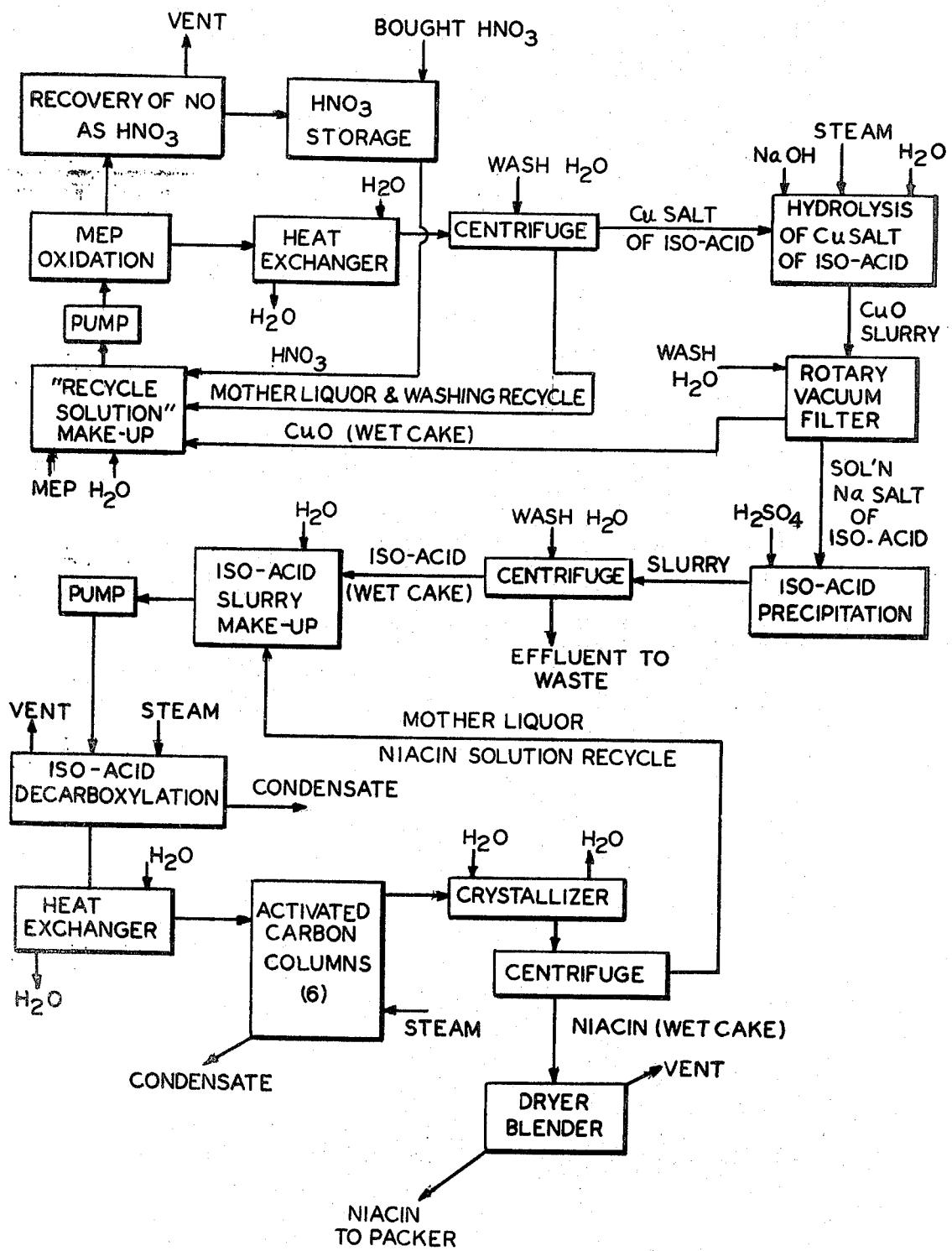

Souren Zacharia Avedikian, 34 Athens Road, Short Hills, N.J. 07078
Filed May 28, 1970, Ser. No. 41,586
Int. Cl. C07d *31/36*
U.S. Cl. 260—295.5 R        8 Claims

ABSTRACT OF THE DISCLOSURE

This invention relates to a novel and improved continuous process for the production of Isocinchomeronic acid, hereinafter referred to as "ISO-ACID,"

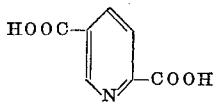

by continuously hydrolyzing at an elevated temperature in an aqueous medium an insoluble metal salt of "ISO-ACID," such as copper isocinchomeronate, hereafter referred to as "Cu Salt of ISO-ACID,"

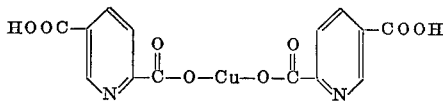

with an alkaline material, such as sodium hydroxide, to give in solution a soluble metal salt of "ISO-ACID," such as sodium isocinchomeronate, hereinafter referred to as "Na Salt of ISO-ACID,"

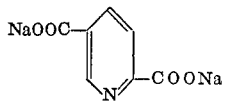

and an insoluble metal oxide, such as CuO, separating the solution from the solid oxide, which is then recycled, and adding to the solution an acid, such as sulfuric acid, to precipitate "ISO-ACID" and separating the "ISO-ACID" and washing it; and Nicotinic acid, hereinafter referred to as "NIACIN"

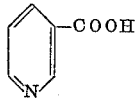

by continuously decarboxylating "ISO-ACID" in an aqueous slurry at elevated temperature and pressure, to yield a solution of "NIACIN," evaporating said solution to dryness to yield "NIACIN" having a purity suitable for use in animal feed supplements or treating said solution by decolorization and crystallization and drying of the "NIACIN" to yield a U.S.P. "NIACIN" for use as a drug and for food enrichment for human consumption, and recycling the remaining solution.

The steps of the instantly claimed process are graphically illustrated by the flow sheet in the drawing.

---

This invention relates to a novel and improved process for the production of nicotinic acid, one of the B-complex vitamins, sometimes referred to as vitamin B-3, hereinafter referred to as "NIACIN," and as shown on the drawing. The name approved by the International Union of Chemistry is 3-pyridinecarboxylic acid.

The importance of "NIACIN" in human nutrition, animal feedstuffs and in fighting various diseases, for example atherosclerosis and schizophrenia, has become apparent and its use has grown substantially over the years. The United States Tariff Commission reported a production of 122,000 lb. in 1941. In 1969, the U.S. production amounted to over 2 million pounds with another 2 million pounds imported from Europe, with a small amount from Japan, to satisfy the needs of the United States.

Because of this growing importance of "NIACIN" and the new uses being found for it, the search for more efficient processes has been pressed continually since the granting of my U.S. Pat. No. 3,081,307 on Mar. 12, 1963.

In that patent, the invention produced a quantitative yield of copper isocinchomeronate, hereinafter referred to as "Cu Salt of ISO-ACID," and as shown on the drawing, in a continuous process, and converted this to isocinchomeronic acid, hereinafter referred to as "ISO-ACID," and as shown on the drawing, in a batch process. These are precursors of "NIACIN" inasmuch as the decarboxylation of "ISO-ACID" yields "NIACIN," which was carried out at high temperature and pressure also as a batch process.

With this invention, conditions of operation make it possible to carry out the conversion of "Cu Salt of ISO-ACID" to "ISO-ACID" and the decarboxylation of the latter to "NIACIN" in continuous processes. It has been found that these continuous processes result in substantial savings in time, equipment required and utilities (steam, electricity and water) needed. As a result, the cost of producing "NIACIN" is lowered thus making this important vitamin of the B-complex group more readily available. It is considered possible that lower cost will be an incentive to the finding of newer and more extensive uses for this chemical product.

The "Cu Salt of ISO-ACID" resulting from the continuous process taught by U.S. Pat. No. 3,081,307 is a relatively dense, blue crystalline solid, sand-like and easily filterable. In the preferred embodiment of my present invention, the filter or centrifuge cake of these blue crystals is hydrolyzed in a continuous and cyclic process into a soluble salt of "ISO-ACID" and insoluble copper oxide. The soluble salt of "ISO-ACID" is converted into "ISO-ACID" as described below and the CuO is recycled to produce more "Cu Salt of ISO-ACID" in accordance with the process taught by the patent cited above. The hydrolysis is carried out by bringing into intimate contact the streams of "Cu Salt of ISO-ACID" and heated alkaline solution, such as sodium hydroxide, making a slurry thereof, and feeding this slurry continuously into a suitable reaction vessel maintained at or above 200° F. by some suitable means such as live steam. After a short period of time, as it progresses along the reaction vessel, the slurry of the "Cu Salt of ISO-ACID" changes into a suspension of black copper oxide (CuO) in the alkaline solution of sodium isocinchomeronate, hereinafter referred to as "Na Salt of ISO-ACID," and as shown on the drawing. The ratio of alkaline material to "Cu Salt of ISO-ACID" is automatically maintained so the slurry is at a pH of 11–12 at all times. In the case when sodium hydroxide is used as the alkaline material, the ratio of "Cu Salt of ISO-ACID" to NaOH is approximately 2.36 to 1 which is in slight excess over the stoichiometric amount required. In the case when potassium hydroxide is used as the alkaline material, the ratio is about 1.70 to 1. Other alkaline materials that may also be used are sodium carbonate, potassium carbonate, etc. The hydrolysis reaction is illustrated by the following equation, where NaOH is shown as the alkaline medium.

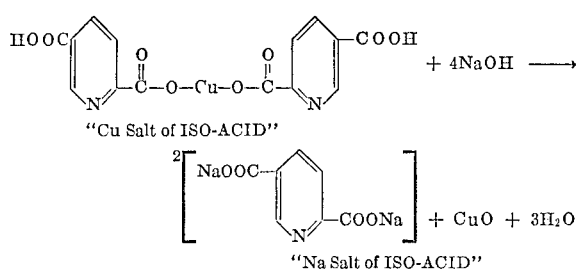

"Cu Salt of ISO-ACID"

$$\left[ \text{NaOOC}-\underset{N}{\bigcirc}-\text{COONa} \right]_2 + \text{CuO} + 3\text{H}_2\text{O}$$

"Na Salt of ISO-ACID"

The solution of "Na Salt of ISO-ACID" containing suspended CuO is fed continuously from this reaction vessel to a solids separating device such as a filter or a centrifuge to separate the CuO as a filter cake, to wash it free of mother liquor and recycle it to the "Cu Salt of ISO-ACID" producing process taught by U.S. Pat. No. 3,081,307 and to furnish the filtrate solutions to the subsequent continuous process for the production of "ISO-ACID." The hydrolysis of the "Cu Salt of ISO-ACID" into CuO and the soluble salt of "ISO-ACID" is complete and quantitative under the conditions of this continuous process. In the preferred embodiment of my invention, a rotary vacuum filter is used to accomplish this separation.

In connection with the filtering of the CuO, it has been found that the filtration rate can be increased by using a poly-electrolyte "floc" agent. The amount used is of the order of 0.1% by weight of the CuO precipitated.

The "ISO-ACID" used in the decarboxylation operation to yield "NIACIN" is produced in a continuous flow by concurrently feeding into a suitable reaction vessel the stream of the aqueous solution of the soluble salt of "ISO-ACID" and an acid in essentially stoichiometric amounts to precipitate the "ISO-ACID" as a slurry in the salt solution of the acid used. It has been found that by controlling the flows of the acid and the alkaline, soluble salt solution of "ISO-ACID" at a rate to give a pH of 1.5 to 2.0, the required stoichiometric ratio is automatically attained and maintained. This results in complete, quantitative precipitation of the "ISO-ACID." In the preferred embodiment of my invention, I use sulfuric acid as the acidifying agent. In this case, the ratio of the "Na Salt of ISO-ACID" and $H_2SO_4$ is about 2.16 to 1. Nitric acid can also be used and the ratio in that case is 1.68 to 1. Another acid that may also be used is HCl. The "ISO-ACID" precipitation reaction is illustrated by the following equation where $H_2SO_4$ is the acid used.

In addition to the "Cu Salt of ISO-ACID" which is the insoluble salt of the preferred embodiment of my invention, the insoluble metal salts may include the "ISO-ACID" salts of lead, mercury and silver.

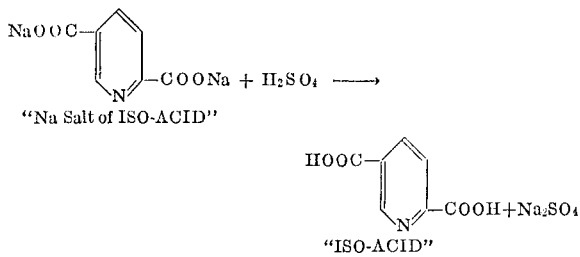

"Na Salt of ISO-ACID"

"ISO-ACID"

The resulting slurry of "ISO-ACID" at a pH of 1.5 to 2.0 is fed continuously from the reaction vessel to a solids sperating device such as a filter or a centrifuge where the "ISO-ACID" is recovered as a filter or a centrifuge cake, and is thoroughly washed free of mother liquor. The filtrate effluent is discarded as it contains less than 0.1% "ISO-ACID." However, if nitric acid were the precipitating agent rather than sulfuric acid or hydrochloric acid, the filtrate would be rich in nitrates and could be used as a plant nutrient especially from a large scale operation. In the preferred embodiment of my invention, a centrifuge is used. "ISO-ACID" is an ideal solid to separate by centrifugation and can be washed effectively by displacement washing and can be spun dry to a moisture content of about 25%.

The washed and spun centrifuge cake is slurrified continuously with water and recycled filtrate from the "NIACIN" recovery operation detailed below, and is fed under pressure through suitable heat exchangers to a reactor maintained at the temperature and pressure found to effect continuous decarboxylation of the "ISO-ACID" to "NIACIN." In the preferred embodiment of my invention, an "ISO-ACID" slurry concentration of about 19% is used as the continuous feed to the reactor. The decarboxylation is carried out at a temperature of about 400° F., preferably 405–410° F. and a pressure of about 500 lb./sq. in. (34 atmospheres) by feeding the "ISO-ACID" slurry continuously to and withdrawing continuously from the reactor "NIACIN" enriched solution at a pH of 3.5 and containing about 13% dissolved "NIACIN."

This solution is cooled and depressurized sufficiently to permit passage through activated carbon columns at 160° F. or higher. The resulting stream of "NIACIN"-rich solution is discharged into a continuous crystallizer. Upon cooling to 68° F. or lower, "NIACIN" crystallizes out copiously. The crystals of "NIACIN" are recovered by filtration or centrifuging of the slurry. The cake is not washed. It contains about 20%–50% of mother liquor depending upon whether the slurry is filtered or centrifuged. The wet cake on "NIACIN" is dried in any suitable dryer, for example a rotary, truck-tray, fluidized bed or double cone, vacuum batch dryer. The double cone, vacuum batch dryer is preferred in the practice of this invention as a convenient means of segregating and identifying production by assigning batch numbers at this point. The resulting dry "NIACIN" is a product of high purity, meets U.S.P. specifications and is suitable for human consumption—as a drug and for food enrichment.

"NIACIN" for use in animal feed supplements is not required to meet U.S.P. specifications. For this application, the solution emanating from the decarboxylation reactor is evaporated to dryness directly without going through the activated carbon treatment for decolorizing the solution and without a separate crystallization operation. The "NIACIN" produced in this case is not pure white, but has a slightly yellow tint. The purity, however, is higher than 99%.

The decarboxylation reaction is illustrated by the following equation.

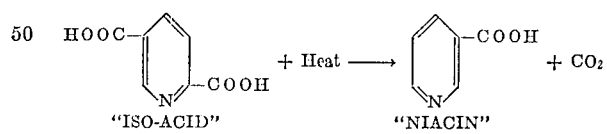

"ISO-ACID"      "NIACIN"

The following is an example of the preferred embodiment of my invention for the continuous production of "ISO-ACID" and "NIACIN." A continuously produced stream of approximately 650 parts of "Cu Salt of ISO-ACID" per hour is intimately mixed with a stream of about 260 parts of sodium hydroxide in the presence of about 2,200 parts of water giving an approximately 21% slurry of "Cu Salt of ISO-ACID" in caustic solution, the pH of the slurry is automatically controlled at 11–12 with sodium hydroxide as needed, and the temperature maintained at about 212° F. with live steam or suitable heating means on the jacket of the reaction vessel. The hydrolysis proceeds rapidly and in about 15 minutes or less, the time required for the mixture to progress from the inlet of the reaction vessel to the outlet, the reaction is complete and a suspension of black CuO is obtained in an alkaline solution of the "Na Salt of ISO-ACID." This suspension is fed continuously to a rotary vacuum filter and the CuO cake washed free of mother liquor with about 80–90 parts of water which becomes part of the filtrate. The CuO, containing about 35% moisture, is returned to the continuous-cyclic process taught by U.S. Pat. No. 3,081,307 to produce more of the "Cu Salt of ISO-ACID" by furnishing the Cu. The filtrate is fed as a continuous stream, at a rate of about 2,600 parts per hour and containing about 690 parts of the "Na Salt of ISO-ACID" concurrently with a stream of sulfuric acid at a rate sufficient to maintain a pH of 1.5 to 2.0, into a suitable reaction vessel and this gives complete, quantitative precipitation of the "ISO-ACID" at a rate of about 540 parts of "ISO-ACID" per hour.

This continuous stream of "ISO-ACID" slurry is centrifuged and the filtrate effluent discarded. The cake is washed free of adhering mother liquor and after spinning contains about 25% moisture as it is fed continuously to the decarboxylation reaction, as described above. The continuous "NICAN" operation produces about 380 parts of U.S.P. "NIACIN" per hour in this example.

While the method and more specifically the preferred embodiment have been described in detail, it will be understood that various modifications in procedure, additions of operations, concentrations of reactants and rates may be introduced without departing from the scope of the invention and it is intended that the specific descriptions and the example above cited shall be interpreted as illustrative. Various changes and modifications can be made without departing from the invention as defined in the claims.

What is claimed is:

1. The process of making isocinchomeronic acid which consists essentially of continuously mixing a cupric salt of isocinchomeronic acid with an aqueous solution of alkaline material, selected from the group consisting of sodium hydroxide, potassium hydroxide, sodium carbonate and potassium carbonate, reacting the mixture at about 200° F. to hydrolyze the cupric salt to produce an insoluble oxide of copper and a solution of a soluble salt of isocinchomeronic acid, removing the insoluble oxide from the mixture, treating the solution of the soluble salt of isocinchomeronic acid in a continuous stream wtih an acid reagent to precipate isocinchomeronic acid continuously in a slurry of the isocinchomeronic acid in a solution of the acid reagent and the said alkaline material, continuously withdrawing slurry and separating the isocinchomeronic acid from the solution, and washing the isocinchomeronic acid.

2. The process described in claim 1 characterized by continuously forming a new slurry of the washed isocinchomeronic acid, feeding the new slurry to a zone of about 34 atmospheres of pressure in which the isocinchomeronic acid is subjected to heat sufficient to decarboxylate the isocinchomeronic acid to nicotinic acid, venting the gaseous product of the decarboxylation, cooling the solution containing the nicotinic acid and reducing the pressure to which the solution is subjected while maintaining sufficient pressure to prevent boiling of the solution, crystallizing the nicotinic acid out of the solution, and drying the nicotinic acid crystals.

3. The process described in claim 2 characterized by removing impurities, including discoloration impurities, from the nicotinic acid solution while retaining the nicotinic acid in solution, and after removing the impurities, crystallizing nicotinic acid out of the solution.

4. The process described in claim 2 characterized by removing the nicotinic acid crystals from the solution and leaving a saturated solution of nicotinic acid which constitutes a mother liquor, and recycling the mother liquor to the washed isocinchomeronic acid as part of said new slurry.

5. The process described in claim 2 characterized by removing impurities, including discoloration impurities, from the nicotinic acid solution before crystallizing nicotinic acid out of the solution, removing the crystallized nicotinic acid from the mother liquor in which the nicotinic acid crystallization forms and recycling the mother liquor back to the washed isocinchomeronic acid as part of the slurry formed with said washed isocinchomeronic acid.

6. The process as described in claim 3 characterized by removing impurities from the nicotinic acid solution by passing the solution through activated carbon.

7. The process described in claim 1 characterized by hydrolyzing the metal salt at a temperature between 200° F. and the boiling point of the solution at the pressure of the solution during the hydrolyzing operation.

8. The process described in claim 1 characterized by the acid reagent being from the group consisting of sulfuric acid; nitric acid and hydrochloric acid.

References Cited

UNITED STATES PATENTS

| 3,081,307 | 3/1963 | Avedikian | 260—295 R |
| 3,291,803 | 12/1966 | Duesel | 260—295.5 R |

OTHER REFERENCES

Lukes et al., Chemical Abstracts, vol. 56, 11,564–c–g (1962).

ALAN L. ROTMAN, Primary Examiner